31-94 SR
3/3/87 03 H 000,226

United States Statutory Invention Registration [19]

[11] Reg. Number: H226

Willett [43] Published: Mar. 3, 1987

[54] TOOL FOR SELECTIVELY REMOVING OR INSTALLING CONNECTOR ENDS OF A CLUSTERED TERMINAL ASSEMBLY

[75] Inventor: Norman F. Willett, Colonial Beach, Va.

[73] Assignee: The United States of America as represented by the Secretary of the Navy, Washington, D.C.

[21] Appl. No.: 908,560

[22] Filed: Sep. 18, 1986

[51] Int. Cl.[4] ..... B25B 13/28

[52] U.S. Cl. ..... 81/94; 81/488

*Primary Examiner*—Charles T. Jordan
*Assistant Examiner*—Michael J. Carone
*Attorney, Agent, or Firm*—Thomas E. McDonnell; Elmer E. Goshorn

[57] ABSTRACT

Improved manually operable and remotely controlled tool for selectively removing or installing connector ends of a clustered arrangement of interconnected cables of an electric terminal assembly. The tool is generally made up of hub means and opposed jaw means. One end of elongated sleeve means is affixed to the hub means while the other end is connected to first handle means. Shaft means is rotatably disposed in the sleeve means with one end of the shaft means affixed to cam means and the other end to second handle means that is freely disposed in an aperture of the first handle means. During tool use, the user normally grips both handle means and maneuvers the hub and jaw means between a series of cables on one side of an electric terminal assembly having a plurality of interconnected cables until the jaw means are disposed about a selected cable of the series of cables. Upon placement of the jaw means over the socket end of the selected cable, the second handle means is rotated for the purpose of securing the socket end between the jaw means and cam means. Then the tool is selectively moved in an axial and/or rotational direction for the purpose of effecting either assembly or disassembly of the associated socket/plug ends of at least one set of interconnected cables.

10 Claims, 7 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 1
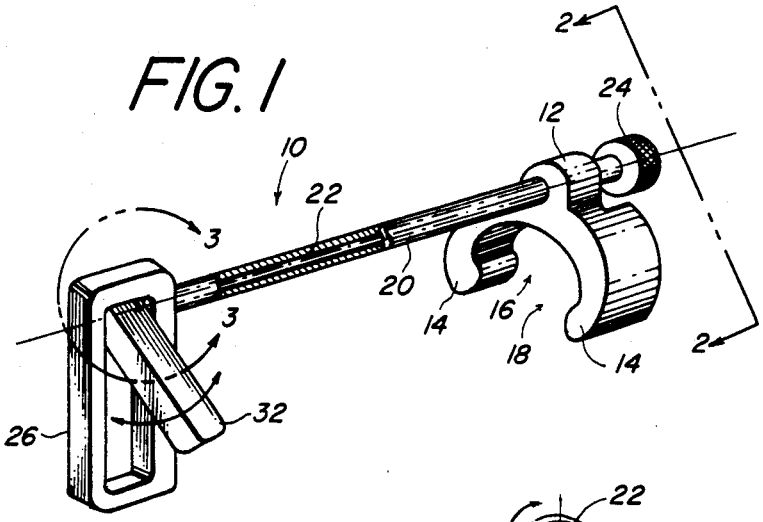
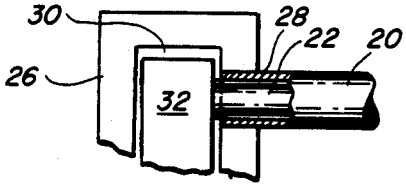
FIG. 3
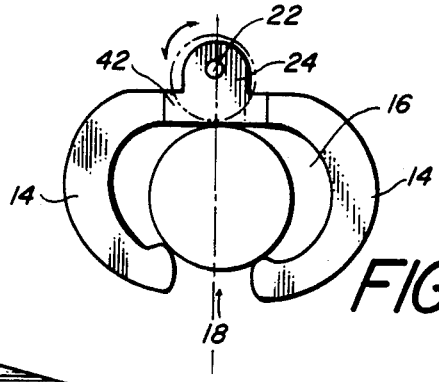
FIG. 2
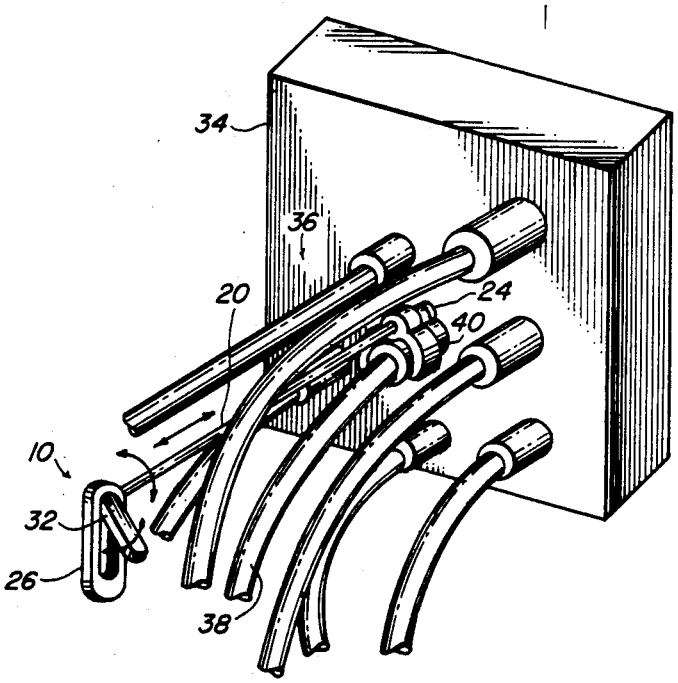
FIG. 4

TOOL FOR SELECTIVELY REMOVING OR INSTALLING CONNECTOR ENDS OF A CLUSTERED TERMINAL ASSEMBLY

This invention concerns a manually operable tool for selectively removing or installing connector ends of a clustered series of cables of a terminal assembly; and more particularly, it relates to an improved manually operable and remotely controlled portable tool for selectively removing or installing connector ends of a clustered series of interconnected cables of a terminal assembly.

BACKGROUND OF THE INVENTION

Various tools have been designed in the past to meet the particular needs in solv an assembly or disassembly problem. For example, U.S. Pat. No. 4,068,374 to J. R. Coler discloses a manual tool having a double-handle and wedge-clamping arrangement for effecting either removal or installation of a housing from a pair of electric contact members. The tool is generally made up b of a forwardly disposed wedge for initially separating a pair of contact members of a circuit board and the like. A pair of pivotally and resiliently mounted clamping elements are provided such that the wedge is interposed therebetween. One handle supports the wedge and the pair of clamping elements while the other handle is pivotally mounted and has a cam-shaped end for controlling the opening and closing of the clamping elements. When the tool is placed over a contact member housing, the contact members are separated by the wedge and the other handle is actuated to grip the housing for removal in an axial direction without causing abrasive injury to the contact member surfaces. Conversely, the tool will assemble a housing to a pair of contact members, since the tool wedge will separate the pair of contact members prior to the housing being fully assembled to the contact members. U.S. Pat. No. 4,414,736 to R. F. Fieburg et al. concerns a manual tool for selectively inserting or removing electric leads from a multi-lead connector plug. The tool is generally made of a hand-grippable tool body. The body is provided with a finger-actuatable spring-biased slider. The outer end of the slider includes a movable finger-like jaw, the transverse section of which is in the shape of a semicircle. An opposed jaw also of semicircle configuration is affixed to the tool body. An electric-insulated lead is gripped between the jaws for the purpose of being either connected or disassembled from any one of a series of pin connection openings of an elastomeric plug. By virtue of the elongated extent of the movable jaw together with maneuvering of the tool in close or immediate proximity to the plug, one or more leads is readily installed in or removed from its associated pin connection opening of the series thereof that are provided in the plug.

Hand-service tools for effecting assembly and disassembly of components have a wide variety of shape, size and use. Despite this multitude of tools as evidenced by the aforediscussed prior art, advancing technology, particularly in the electric/electronic industry, create new problems that render prior servicing tools ineffective. Thus, these problems create opportunities for innovative solutions. In the absence of an existing tool meeting a particular problem of advanced technology, the use of advanced technology is limited. In the area of electric terminal assemblies for interfacing and interconnecting various components of one or more networks, a series of connections of different sizes are frequently required and because of the limited space available, the series of different sized connections are normally arranged in close-clustered relationship. Further, because of the design requirements of the connections requiring a positive snap-lock connection in order to maintain electric connection under all conditions of terminal use, the clustered arrangement of the series of connectors for the plurality of interconnected different-size cables renders assembly or disassembly of these connectors by currently available tools either an impossible situation or an impractical approach. Further, none of the prior art tools recognized the importance of an elongated unitized tool for remote axial and/or rotatable control and selective access into a clustered arrangement of a series of interconnected different-size cables at an electric terminal so as to permit either connection or disconnection of the tightly connected socket-plug connections of the interconnected cables. In other words, by reason of electric/electronic networks being provided with increasing complex multiple and different-sized cable terminal interconnections and having more difficult access or servicing requirements, an improved somewhat universal elongated and remotely operated unitized tool is needed in being able to service a variety of different-size cable interconnections.

Accordingly, none of the aforediscussed prior art, whether taken alone or in any combination, remotely suggest an improved elongated, manually operable and unitized tool of lightweight construction for remote access and selective axial and/or rotation control for effecting connection/disconnection of any one of a plurality of different-size socket/plug connections in a clustered arrangement of a series of interconnected cables of an electric terminal. The tool is generally made up of opposed and fixed jaws of special shape with a slot therebetween so as to accommodate and grip a wide range of socket end connections of different diametrical sizes of a series of interconnected cables to be serviced for one reason or another. A combined handle and sleeve arrangement is affixed at one end to the opposed jaws and remotely supports and controls the jaws so that they can be maneuvered into and out of engagement with a socket end being serviced. A second handle is rotatably mounted within the first handle and is connected by shaft means to a rotatable cam for causing gripping of an engaged socket end between the cam and opposed jaws for the purpose of effecting either assembly or disassembly of the socket end of one cable from its associated plug end of an interconnected cable at an electric terminal.

SUMMARY OF THE INVENTION

An object of the invention is to provide an improved manually operable elongated tool of unitized and lightweight construction that permits use by one with minimal skill in servicing socket-type connections of a series of clustered and interconnected cables of an electric terminal.

Another obJect of the invention is to provide an improved manually operable elongated tool of unitized and lightweight construction that, because of its special jaw-shaped end, is capable of handling a wide range of different-size socket connections for a series of clustered and interconnected cable sections of an electric terminal.

Still another object of the invention is to provide an improved manually-operable elongated tool of simple construction that normally requires neither adjustment nor repair despite repeated use.

In summary, the improved manually-operable, elongated tool of unitized and lightweight construction is generally made up of hub means and opposed fixed jaw means depending therefrom. The opposed jaw means are of elliptical shape so as to define an elliptically-shaped opening therebetween. The opposed and relatively spaced free ends of the jaws define a slot therebetween in direct communication with the opening. The lateral extent of the slot is less than the minor axis of the opening but still of an extent that will accommodate a wide range of different-size cables. The socket end of a cable is accommodated and engaged by the tool in order to carry out service requirements of a set of interconnected cables at an electric terminal.

Sleeve means is affixed at one end to the hub means. A first handle of approximately O-shaped configuration is preferably affixed in offset fashion to the other end of the sleeve means so as to provide the user of the tool with a pistol-like grip of the first handle during tool use. Shaft means is inserted in the sleeve means such that one end extends beyond the outer end of the hub means. An eccentric cam is affixed to the shaft means outer end. The first handle is provided with an aperture for freely receiving a second handle of block-like shape. The sleeve means in being connected to the first handle is such that the interior of the sleeve is in direct communication with the aperture of the first handle means. The other end of the shaft means is affixed to the second handle when it is inserted in the first-handle aperture The jaw means are normally of such a longitudinal extent that the outer longitudinal ends extend beyond the hub means. Because of this extent, a groove is provided in the top of the jaw means adjacent the hub means. The groove is in direct communication with the jaw-means opening. Since the groove has a lateral extent greater than the eccentricity of the cam means, the cam means is free to enter both the groove and the jaw-means opening during rotation of the shaft means. The slot between the jaw means free ends is normally disposed in centered relation to the minor axis of the jaw means opening. Also, the axes of the hub means and shaft means along with the minor axis of the jaw-means opening, all preferably lie in a common plane.

In an operative embodiment of the tool, a user grips the first and second handles in pistol-like fashion and maneuvers the tool between a series of interconnected and clustered cable means (usually of different cross sectional size) on one side of an electric terminal until the intended set of interconnected cable means to be serviced is aligned with the jaw end of the tool. The tool is maneuvered until the socket end of the selected cable means on one side of the terminal is inserted through the slot and arranged in the opening such that the jaw means are loosely disposed about the inserted socket end. The second handle is then rotated relative to the first handle until the cam engages a portion of the socket end. At the same time, the jaw means engage opposed and other spaced portions of the inserted socket end so that the socket end is positively gripped between the cam means and jaw means. With this grippage, the tool is further maneuvered by the user so as to cause selective rotative and/or axial movement of the tool-gripped socket end of one cable in relation to its associated plug end of another and interconnected cable of the set of interconnected cables so as to cause disconnection of same from its associated plug end. After disconnection of the socket end, the portable tool can be remotely and controllably operated in reverse fashion for assembling the socket end to its associated plug end.

Other objects and advantages of the invention will become more apparent hereinafter when the detailed description of the invention is taken into account with the accompanying drawings.

BRIEF DESCRIPTION OF THE DRAWINGS

FIG. 1 is a perspective view with parts broken away of an improved manually operable elongated tool of the invention.

FIG. 2 is an elevational view with parts added as taken along 2—2 of FIG. 1.

FIG. 3 is an enlarged elevational view taken within the bounds of encompassing line 3—3 of FIG. 1 and with parts broken away and illustrates further details of the invention.

FIG. 4 is a perspective view of the improved tool of the invention in conjunction with a representative diagrammatic perspective view of an electric terminal assembly for a series of interconnected cables and illustrates an operative embodiment of the tool in relation to one cable of a set of interconnected cables of the series of interconnected cables of the assembly.

DETAILED DESCRIPTION OF THE INVENTION

Figure 5:
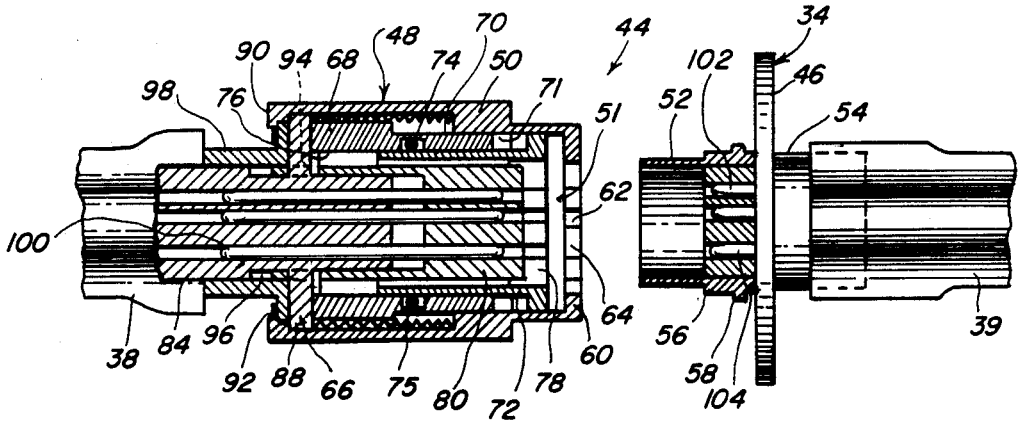
FIG. 5 is a combined fragmented diagrammatic and longitudinal sectional view of a representative socket-plug connection of one set of interconnected cables of the electric terminal assembly and illustrates the connection in an open position.

With further reference to FIG. 1, a manually operable and remotely controlled tool 10 is provided for use with a wide range of different-size cables. The tool is generally made up of a hub 12 and opposed Jaws 14 depending therefrom. The Jaws are of special shape and define an elliptical-shaped opening 16 therebetween. A slot 18 extends between the free ends of the jaws 14 and is in direct communication with opening 16. One of the advantages of the slot is that it permits quick release or attachment of the tool from a selected cable during tool use. An elongated sleeve 20 is connected to the hub and is preferably aligned with the hub central axis. A shaft 22 is rotatably disposed in the sleeve such that one end extends through and beyond the hub and is affixed to a rotatable eccentric cam 24. As best shown in FIG. 2, tool opening 16 is of elliptical shape such that the minor axis of the opening along with the axes of the hub and shaft 22 all preferably lie in a common plane. Also, slot 18 between the opposed free ends of jaws 14 is arranged in centered relation to the minor axis of opening 16.

A first handle 26 of approximately O-shaped configuration is affixed to the other end of the sleeve. As best shown in FIG. 3, one major link portion of handle 26 is provided with a bore 28 for receiving the end of sleeve 20. The interior of sleeve 20 is in direct communication with aperture 30 of the first handle. As evident from FIG. 3, bore 28 is disposed at the upper end of handle 26 and thus is offset from the transverse axis of handle 26. By reason of the offsetness of the handle in relation to sleeve 20, the user can grasp handle 26 in pistol-like fashion upon maneuvering of tool 10 during use.

A second handle 32 of preferably solid construction and block like shape is freely inserted in aperture 30 and affixed at its upper end on one side thereof to the other end of shaft 22. Second handle 32 is rotatable in either direction about the axis of shaft 22. Handle 32 in rotating about shaft axis 22 moves in a plane transverse of handle 26 and is arranged at a right angle to the axis of shaft 22. Further, rotation of second handle 32 in either direction about the shaft axis also causes corresponding rotation of cam 24. If desired, a coil spring (not shown) can be interposed between and interconnected to sleeve 20 and shaft 22 in appropriate fashion so as to provide a bias to handle 32 and urge same to one position such as shown in FIG. 1.

With reference to FIG. 4, tool 10 is intended to be preferably used with an electric terminal assembly such as, e.g., a terminal assembly 34 having an array of a series of seven (7) sets of relatively spaced and clustered interconnected cable sections 36 on opposite sides of the assembly. Although only one side of assembly 34 is depicted in FIG. 4, it is evident that each one of the cable sections is of different size in cross section and thus the socket end of each cable section of the series of cable sections 36 is also of different size. Slot 18 has a lateral extent greater than the diameter of any cable section of the series and is freely inserted thereover. As further evident in FIG. 4, tool 10 has been maneuvered by the user so that it is inserted between the terminal ends of certain cable sections of the series from a remote location outside of the clustered series of cable sections 36 until slot 18 at the jaw end of the tool is inserted over a given and selected cable section 38. At this time, jaws 14 are advanced relative to cable section 38 therebetween until the jaws encompass and initially engage socket end 40 of cable section 38.

In order to assure ample grippage by jaws 14 of socket end 40 to be assembled or disassembled, each jaw is provided with a longitudinal extended portion that extends beyond the outer end of hub 12 as best shown in FIG. 1. By reason of these jaw-extended portions, a groove 42 is provided therebetween at the hub end of jaws 14 as best shown in FIG. 2. Groove 42 has a lateral extent greater than the eccentricity of cam 24. Hence, upon rotation of shaft 24, cam 24 is freely rotatable so that cam 24 freely advances into and out of the upper end of opening 16 without becoming bound between the opposed wall portions of jaws 14 that define groove 42 therebetween.

With tool 10 in the initial engaging position of FIG. 4, second handle 32 is rotated by the user thereby rotating shaft 22 and cam 24 until the cam engages an upper portion of socket 40 and also forces the socket into engagement with opposed and spaced lower portions of jaws 14 adjacent slot 18 (as best shown in FIG. 2). At the same time, with the user holding cam 24 in position for grippingly engaging socket 40 between cam 24 and jaws 14, the user can further maneuver the tool by grasping both handles 26 and 32 for causing selective axial and rotatable motions relative to and about the axis of sleeve 20 so as to effect assembly and/or disassembly of socket 40 from its associated plug of one set of interconnected cable sections of assembly 34 as will now be described.

With reference to FIG. 5, an enlarged longitudinal sectional and fragmented diagrammatic view of an appropriate socket/plug connector 44 is shown that can be used for periodically coupling or decoupling one set or a pair of interconnectable cable sections 38 and 39 across the plug interface support 46 of a terminal assembly 34 Socket 48 of connector 44 is generally made of a housing 50. The reduced end of housing 50 is provided with an opening 51 for receiving the connecting sleeve 52 of a plug 54 to connector 44. The outer periphery of the trailing end of plug sleeve 52 is provided with a series of circumferentially spaced lugs 56 of different arcuate extent (only two lugs 56 of the series being shown in section). Each lug 56 is provided with an outwardly extending radial flange 58. The reduced and outer end of housing 50 in defining opening 51 is provided with an inwardly directed annular lip 60. The inner peripheral surface of lip 60 is provided with a series of circumferentially spaced lugs 62 of different arcuate extent that are arranged to longitudinally align with the series of grooves (not shown) interposed between the series of lugs 56 of plug 54. When each socket lug 62 is aligned with its associated plug groove, each one of the series of plug lugs 56 is aligned with its respective socket recess 64 of the series of socket recesses 64 interposed between adjoining socket lugs 62 of the series thereof.

Figure 6:
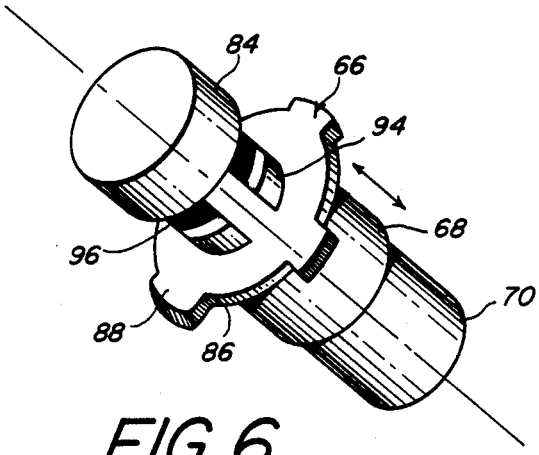
FIG. 6 is an enlarged perspective view of a subassembly of the connection.

Socket 48 is provided with an inner selectively advanceable and rotatable subassembly 66 for effecting positive electric connection/disconnection between socket 48 and plug 54. Subassembly 66 is generally made up of an outer sleeve 68 and a star-shaped element 70 affixed to the enlarged end of sleeve 68 as best shown in FIG. 6. An outer annular surface 70 at the reduced end of sleeve 68 is slidably connected to the inner annular surface 71 at the reduced end of housing 50.

An inner sleeve 72 is rotatably connected to outer sleeve 68 but restrained for limited axial movement in relation thereto. To this end, sleeve 72 is provided with a lug 74 for engaging an internal annular cam-shaped groove 75 of sleeve 68 interposed between the ends of its internal annular surface 76. The inner periphery of sleeve 72 at its outer end is provided with a series of circumferentially inwardly extending radial lugs 78 of different arcuate extent. These series of lugs 78 correspond to and are longitudinally aligned with the series of lugs 62 of housing 50. When plug 54 is initially axially connected to socket 48, plug sleeve 52 slidably interfits in the annular recess between the inner annular surface of inner sleeve 72 and the outer annular surface of rod-shaped inner electric insulator body 80 of elastomeric material of subassembly 68.

Figure 7:
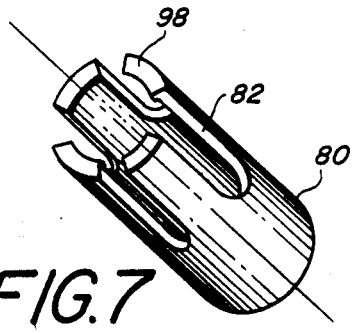
FIG. 7 is a perspective view of a component of the connection.

Body 80 at its outer end is provided with a series of four longitudinally extending and circumferentially spaced fingers 82 as best shown in FIG. 7. Another electric insulator body 84 of elastomeric material is connected to and inserted in the finger end of body 80. Body 84 between its ends is provided with an outwardly extending annular rib 86. Rib 86 is cut away on its outer periphery to provide a series of four circumferentially spaced radial fingers 88. The outer periphery of each finger 88 is slidably connected to the inner annular surface of housing 50 at its enlarged end.

A series of circumferentially spaced longitudinally extending grooves 96 are provided in body 84 between its enlarged end and rib 86. The series of grooves 96 are arranged in alignment with a series of circumferentially spaced arcuate slots 94 that are provided in the inner portions of rib 86. The inwardly directed radial flange 98 of each finger 82 is slidably arranged in its associated groove 96 so as to permit limited axial relative movement between elastomeric bodies 80 and 84 during use of socket 50.

A ferrule 98 is affixed to body 84 at its enlarged outer end and permits connection of the end of a cable section 38 thereto as depicted in FIG. 5. An inward annular flange 90 at the inner end of housing 50 and a split ring 92 are interconnected to the outward annular flange of ferrule 98.

Each body 80 and 84 is provided with a separate series of four axially aligned openings (only three of which are shown) for receiving the opposed ends of a plurality of elongated electric conducting metal pins 100. When socket 50 is initially axially connected to plug 54, snap-lock lug flanges 58 of plug 54 are disposed inside of the inner annular shoulder of flange 60 at the reduced end of socket sleeve 50. At the same time, the series of lugs 56 of plug 54 are also interfitted between and interconnected to the series of lugs 78 of socket sleeve 68. Because of this connection between socket and plug sleeves 72 and 52, rotation of socket housing 50 causes inner sleeve pin 74 of subassembly 66 to axially advance outer sleeve 68 thereof. Advancement of sleeve 68 also advances inner elastomeric body 80 until it abuts the exposed end face of inner elastomeric body 102 of plug 54. Continued rotation of socket housing 50 causes body 84 to advance relative to body 80 until the forward ends of the series of electric contact pins 100 are abutting the outer ends of the series of electric contact pins 104 of plug 54 thereby establishing a positive electric connection between socket 48 and its associated plug 54 of a terminal assembly 34.

In view of the foregoing, it is evident even though the socket plug connection of a terminal may be of complex design, such as aforedescribed, tool 10 of the invention advantageously positively engages the outer housing of a socket from a remote location to effect controlled and precise axial and rotational movements of the socket relative to the plug so as to effect either connection or disconnection of the socket from the plug. Such connection or disconnection during tool use is effected with minimal difficulty, skill and effort by the user. Moreover, regardless of the socket/plug design, even as described above as an example, the tool, because of its elliptically shaped, opposed and fixed jaws, accommodates a wide range of diametrical sizes in cable sections This accommodation usually enables the user of the tool to only need one tool for a terminal to be serviced. Thus, the tool for the most part is universal in application.

Obviously many modifications and variations of the present invention are possible in light of the above teachings. It is therefore to be understood, that within the scope of the appended claims, the invention may be practiced otherwise than as specifically described.

What is claimed is:

1. A manually operable tool for periodically installing or removing a socket end of a cable means from its associated plug end of another and interconnected cable means of a plurality of clustered and interconnected cable means of an electric terminal assembly, said tool comprising:

housing means having hub means and opposed fixed jaw means depending from the hub means, the opposed jaw means defining an elliptical-shaped opening therebetween for receiving and engaging various diametrical sizes of socket ends, the opposed free ends of the jaw means being spaced relative to each other so as to define a slot therebetween such that the slot is in direct open communication with the opening, sleeve means connected to the hub means at one end thereof, first handle means connected to the other end of the sleeve means, said first handle means having an aperture therein in direct open communication with the interior of said sleeve means, said first handle means together with said sleeve means for supporting the jaw means and for assisting in maneuvering the jaw means when inserted between a series of cable means of an electric terminal assembly on one side thereof and being selectively disposed over one of the cable means of the series by the one cable means being inserted through the slot into the opening between the jaw means so that the jaw means can be maneuvered along the cable means until the jaw means initially encompass and loosely engage the socket end of the selected one cable means, the encompassed socket end forming part of a socket-plug connection between interconnected cable means of the assembly, shaft means rotatably mounted in the interior of said sleeve means between its ends, one end of said shaft means extending beyond the outer end of said hub means, the other end of said shaft means extending into the aperture of said handle means, cam means eccentrically connected to the one end of said shaft means and arranged to be partially and selectively inserted in the opening between the jaw means and for grippingly engaging a portion of the socket end of the one selected cable means inserted in the opening, and second handle means inserted in the aperture of said first handle means and connected to the other end of said shaft means, said second handle means being rotatable in either direction about the axis of the shaft means in relation to the first handle means when both handle means are selectively gripped and the second handle means is rotated relative to said first handle means such that the socket end of the one selected cable means inserted in the opening of the jaw means is grippingly engaged at one portion thereof by said cam means while the jaw means simultaneously grippingly engage opposed spaced portions of the socket end of the one selected cable means so as to enable selective rotation and axial movement of the tool-gripped socket end of the one selected cable means in relation to its associated plug end of the interconnected cable means for the purpose of effecting either connection or disconnection of the socket end from its associated plug end during tool use.

2. A tool as set forth in claim 1 wherein the slot is disposed in centered relation to an axis of the opening.

3. A tool as set forth in claim 1 wherein the slot is disposed in centered relation to the minor axis of the opening.

4. A tool as set forth in claim 1 wherein the sleeve means is connected to the hub means in centered relation thereto.

5. A tool as set forth in claim 1 wherein an axis of the opening and the axes of both the sleeve and hub means all lie in a common plane.

6. A tool as set forth in claim 1 wherein the jaw means extend outwardly beyond the outer end of said hub means; wherein the jaw means are also provided with a groove that is disposed adjacent the hub means that is arranged in direct open communication with the opening, and that is spaced from the slot in the jaw means; and wherein the groove is of an extent for freely receiving the cam means upon rotation of said shaft means during tool use.

7. A tool as set forth in claim 1 wherein the slot of said jaw means has an extent less than the extent of the minor axis of the opening.

8. A tool as set forth in claim 1 wherein the first-handle means approximates an O-shaped configuration.

9. A tool as set forth in claim 1 wherein the second handle means is of block-like shape.

10. A tool as set forth in claim 1 wherein the first handle means is connected to the sleeve means such that axes of the sleeve means and the first handle means are in offset relationship to each other.

* * * * *